(12) United States Patent
Ikebe et al.

(10) Patent No.: US 6,418,113 B1
(45) Date of Patent: Jul. 9, 2002

(54) DISK CARTRIDGE

(75) Inventors: Masaru Ikebe; Masatoshi Okamura; Yukio Miyazaki; Kenji Hashizume, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/433,748

(22) Filed: Nov. 4, 1999

(30) Foreign Application Priority Data

| Nov. 5, 1998 | (JP) | 10-314362 |
| Nov. 20, 1998 | (JP) | 10-331339 |
| Nov. 20, 1998 | (JP) | 10-331353 |
| Jul. 15, 1999 | (JP) | 11-201567 |

(51) Int. Cl.⁷ .............................................. G11B 23/03
(52) U.S. Cl. ..................................................... 369/291
(58) Field of Search ...................... 360/133; 206/308.1; 369/291

(56) References Cited

U.S. PATENT DOCUMENTS

| 5,796,713 A | * 8/1998 | Tanaka | 369/291 |
| 5,825,747 A | * 10/1998 | Tanaka | 369/291 |
| 5,917,803 A | * 6/1999 | Goto et al. | 369/291 |
| 6,172,962 B1 | * 1/2001 | Goto et al. | 369/291 |
| 6,205,114 B1 | * 3/2001 | Takekoh et al. | 369/291 |
| 6,205,115 B1 | * 3/2001 | Ikebe et al. | 369/291 |

FOREIGN PATENT DOCUMENTS

| DE | 43 40 761 | 6/1994 |
| EP | 0 744 743 | 11/1996 |
| EP | 0 794 532 | 9/1997 |
| EP | 0 838 819 | 4/1998 |
| EP | 0 902 428 | 3/1999 |
| EP | 0 959 471 | 11/1999 |
| EP | 0 961 272 | 12/1999 |
| EP | 1 018 735 | 7/2000 |
| EP | 1 067 548 | 1/2001 |
| JP | 63-266669 | 11/1988 |
| JP | 7-19464 | 3/1995 |
| JP | 09-213041 | 8/1997 |

OTHER PUBLICATIONS

Patent Abstracts of Japan, vol. 1998, No. 11, Sep. 30, 1998, JP 10 149653, Jun. 2, 1998 cover sheet only.

* cited by examiner

Primary Examiner—William Klimowicz
(74) Attorney, Agent, or Firm—Oblon, Spivak, McClelland, Maier & Neustadt, P.C.

(57) ABSTRACT

A disk cartridge has a casing composed of upper and lower casings 1,2 which are adapted to rotatably receive therein a disk-like medium 4, a shutter 5 attached to the casing so as to open and shut openings for driving shaft insertion holes 11, 12 and magnetic head insertion holes 12, 22 formed in the upper and lower casings 1,2, a disk-like medium taking-out port 15 formed in the casing and a cover member 3 for opening and closing the disk-like medium taking-out port 15, wherein the cover member 3 is disposed in the casing at a position opposing the shutter 5; a disk-like medium placing portion is provided by forming tongue-like projections 36 in the cover member 3 to support the disk-like member 4 from its lower surface side; the cover member 3 is so arranged as to slide between the upper and lower casings 1,2, whereby the disk-like member 4 can be taken out by simply drawing the cover member 3 from the disk-like medium taking-out port 15 or the disk-like medium 4 can be placed by simply inserting it, and operability in exchanging the disk-like medium 4 can be done extremely well. The lower casing 2 is so constructed that a recessed face portion 26 for receiving the tongue-like projections 36 formed in the cover member 3 is formed in an inner face which opposes the disk-like medium 4, whereby the strength of the casing can be well maintained; easy taking-out and insertion of the disk-like medium are permissible, and good operability of exchanging the disk-like medium is obtainable.

8 Claims, 17 Drawing Sheets

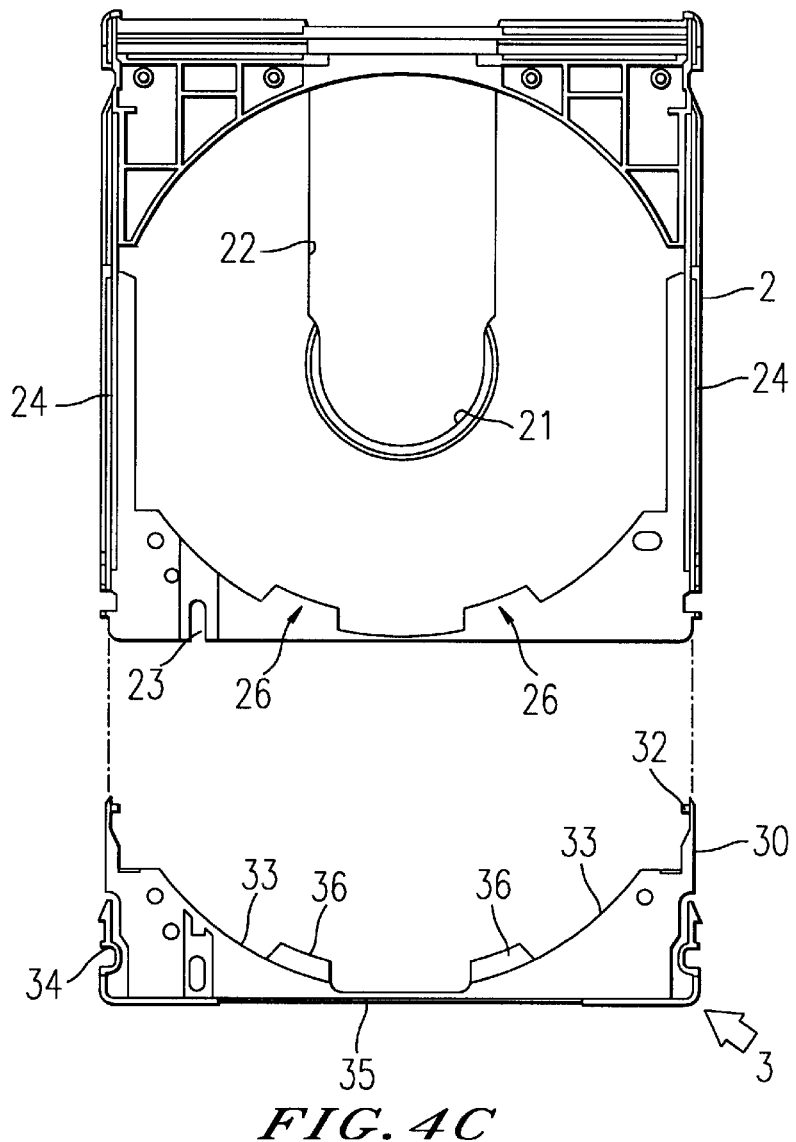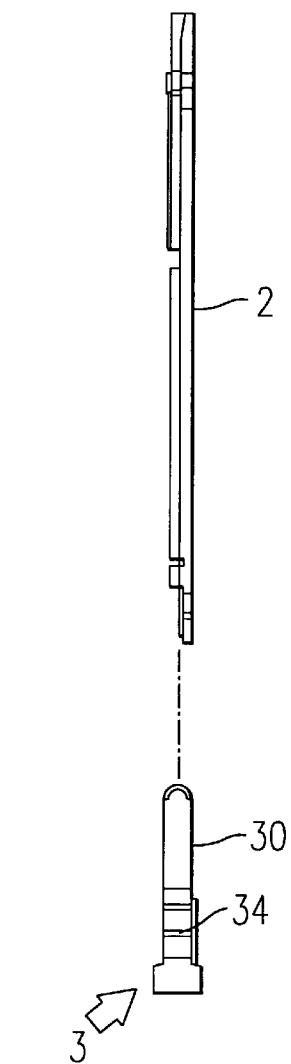

DISK CARTRIDGE

The present invention relates to a disk cartridge adapted to receive a disk-like medium such as a photo disk, a photo-electro-magnetic disk or the like in a casing in a rotatable manner and adapted to take out the received disk-like medium from the casing for exchanging.

It has been known that an information medium such as a disk-like medium, e.g., a magnetic disk, a photo disk or a photo-electromagnetic disk is used in a form of a disk cartridge comprising upper and lower casings in which the information medium is received, and the disk cartridge is provided with a shutter which opens and shuts opening portions such as a head insertion hole and a driving shaft insertion hole formed in the casings. Such disk cartridge is not provided with a taking-out mechanism for exchanging a disk-like medium received in the casings. However, a cartridge called a CD caddy used for CD-ROM is provided with a CD taking-out mechanism. The CD caddy is used for a reproducing device such as a CD-ROM reproducing device. In a case of a disk-like medium used for both cases that the disk-like medium itself is used in a recording/reproducing device and that it is used in a form being received in a disk cartridge, the disk-like medium is sometimes required to be taken out according to requirement.

However, in a conventional disk cartridge having a disk-like medium taking-out mechanism, a shutter mechanism could not be located at a side where there is a cover member capable of turning to take out the disk-like medium. Accordingly, such shutter mechanism could not be used for a disk cartridge of a style that opening portions such as a head insertion hole and a driving shaft insertion hole are formed in the upper and lower casings (JP-A-63-266669).

Further, there have been proposed mechanisms for taking out the disk-like medium by opening only a side face which is opposite the shutter. In such mechanisms, however, there was a restriction that the cover member was of a detachable type or a turning type for opening. In the detachable type, the cover member was separated from the case main body to cause a problem of loss, and the detachable type is inconvenient in handling. On the other hand, in the turning type, there were problems that it was apt to be broken by a shock because the cover member was engaged with the casing main body by means of a pivot pin, and a state of completely shutting might not be obtained because the cover member was inclined when it is to be shut (JP-B-7-19464). These conventional types of disk cartridge had such a structure that when a disk-like medium was to be exchanged, the disk-like medium taking-out port was directed downward so that the disk-like medium dropped by its own weight. Accordingly, the disk-like medium might drop to the ground erroneously.

In some cases, a disk-cartridge is provided with an erroneous insertion preventing mechanism at an outer face of the casing assembly. However, the conventional disk cartridge having a disk-like medium taking-out mechanism was not provided with a mechanism which prevents the mounting of the disk cartridge on a recording/reproducing device in a state that a cover member for a disk-like taking-out mechanism is opened. Accordingly, when the disk cartridge is mounted on the recording/reproducing device in a state that the cover member is opened, the cover member may be broken; the disk-like medium may come off, or the disk may suffer a damage.

It is an object of the present invention to provide a disk cartridge which provides easy exchange of a disk-like medium and prevents the dropping of the disk-like medium while the cover member can easily be molded and a sufficient strength of the casings is assured.

It is another object of the present invention to provide a disk cartridge which provides easy take-out or insertion of a disk-like medium by folding the cover member after the cover member has been drawn from the casing.

It is another object of the present invention to provide a safe and reliable disk cartridge in which a state that the cover member is shut can be detected, whereby there is no danger that the cartridge is used in a state that the cover member is opened.

In accordance with a first aspect of the present invention, there is provided a disk cartridge which comprises a casing comprising an upper casing and a lower casing to receive therein a disk-like medium in a rotatable manner, a shutter for opening and closing an opening portion for a driving shaft insertion hole and a head insertion hole formed in the casing, an elastic member for urging the shutter in a direction of closing the opening portion, a disk-like medium taking-out port formed in the casing and a cover member for opening and closing the disk-like medium taking-out port, wherein the cover member is disposed between the upper and lower casings in a manner of freely sliding so that the cover member is drawn from the disk-like medium taking-out port to take out or place the disk-like medium, the cover member has a circular arc wall so as to be along an outer periphery of the disk-like medium, and a tongue-like projection is formed at a lower edge of the circular arc wall to provide a disk supporting portion to support the disk-like medium from its lower portion.

In the first aspect of the present invention, a pair of tongue-like projections are disposed with a space therebetween symmetrically with respect to a centerline of the cover member in a direction of sliding movement. Further, a recessed face portion for receiving each of the tongue-like projections of the cover member is formed in an inner face, which opposes the disk-like medium, of the lower casing. Further, the casing has a label area in an outer surface at a side of receiving the cover member at a level slightly lower than that of the outer surface, and the wall thickness of the tongue-like projections is thinner than the wall thickness of the recessed face portions for receiving the tongue-like projections of the cover member.

In accordance with a second aspect of the present invention, there is provided a disk cartridge which comprises a casing comprising an upper casing and a lower casing to receive therein a disk-like medium in a rotatable manner, a shutter for opening and closing an opening portion for a driving shaft insertion hole and a head insertion hole formed in the casing, an elastic member for urging the shutter in a direction of closing the opening portion, a disk-like medium taking-out port formed in the casing and a cover member for opening and closing the disk-like medium taking-out port, wherein the cover member is provided, at its both sides, with arms each having a pivot shaft and slide members each provided with a disk placing portion and a bearing hole wherein the slide members are connected to the arms by inserting the pivot shafts into the bearing holes so that the slide members are folded with respect to the arms, and a partition wall is formed in each of the slide members so as to oppose an inner side face of the bearing hole, whereby the cover member is capable of sliding between the upper and lower casings by means of the slide members, and the cover member can be drawn from the disk-like medium taking-out port and folded to take out the disk-like medium.

In the second aspect of the present invention, the cover member is drawn in a manner of freely sliding from the disk cartridge in a direction opposite to the shutter, and a distance of drawing the cover member is determined to be within a range of at least the radius of the disk-like medium. Further, the cover member, after it has been drawn from the disk-like medium taking-out port, can be folded so that a disk-like medium can easily be inserted into or removed from the cover member.

Further, in the second aspect of the present invention, the partition wall is provided with a circular arc wall corresponding to an outer periphery of the disk-like medium to restrict a play quantity of the disk-like medium in its radial direction, and the curvature of the circular arc wall coincides with the position of the revolution center of the disk-like medium. Further, each of the slide members is provided with an engaging portion for moving the disk-like medium accommodated in the casing toward a side of the opening portion when the cover member is moved. In addition, a projection is formed on the pivot shaft of the cover member and a notch is formed in the bearing hole of the slide member to receive the projection, whereby the slide member can be assembled in a state that the cover member is raised to an angle of about 90°.

In accordance with a third aspect of the present invention, there is provided a disk cartridge which comprises a casing comprising an upper casing and a lower casing to receive therein a disk-like medium in a rotatable manner, a shutter for opening and closing an opening portion for a driving shaft insertion hole and a head insertion hole formed in the casing, an elastic member for urging the shutter in a direction of closing the opening portion, a disk-like medium taking-out port formed in the casing, a cover member for opening and closing the disk-like medium taking-out port and an erroneous insertion preventing groove, into which an erroneous insertion preventing detection member is inserted, which is formed in a side wall of the casing at a side of the shutter which opposes the disk-like medium taking-out port, wherein side wall portions are formed in the cover member so as to be capable of sliding in guide grooves formed in inner faces of left and right side walls of the casing, a part of an outer side wall of each of the guide grooves is cut to communicate the erroneous insertion preventing groove, and a side wall of the cover member provides a bottom wall for the erroneous insertion preventing groove when the cover member is in a closing state.

In the third aspect, the cover member is provided at both sides with slide members which are rotatably connected to the cover member by means of connecting means comprising a pivot shaft and a bearing hole, and an outer side face of the slide members faces the erroneous insertion preventing groove. Further, a captive portion is provided in the cover member so that the both side wall portions of the cover member restrict a range of the movement of the cover member.

In drawings:

FIG. 4a is a plan view showing a state that the cover member is separated from the lower casing in FIG. 1;

FIG. 4b is a side view of the cover member and the lower casing shown in FIG. 4a;

Figure 1:
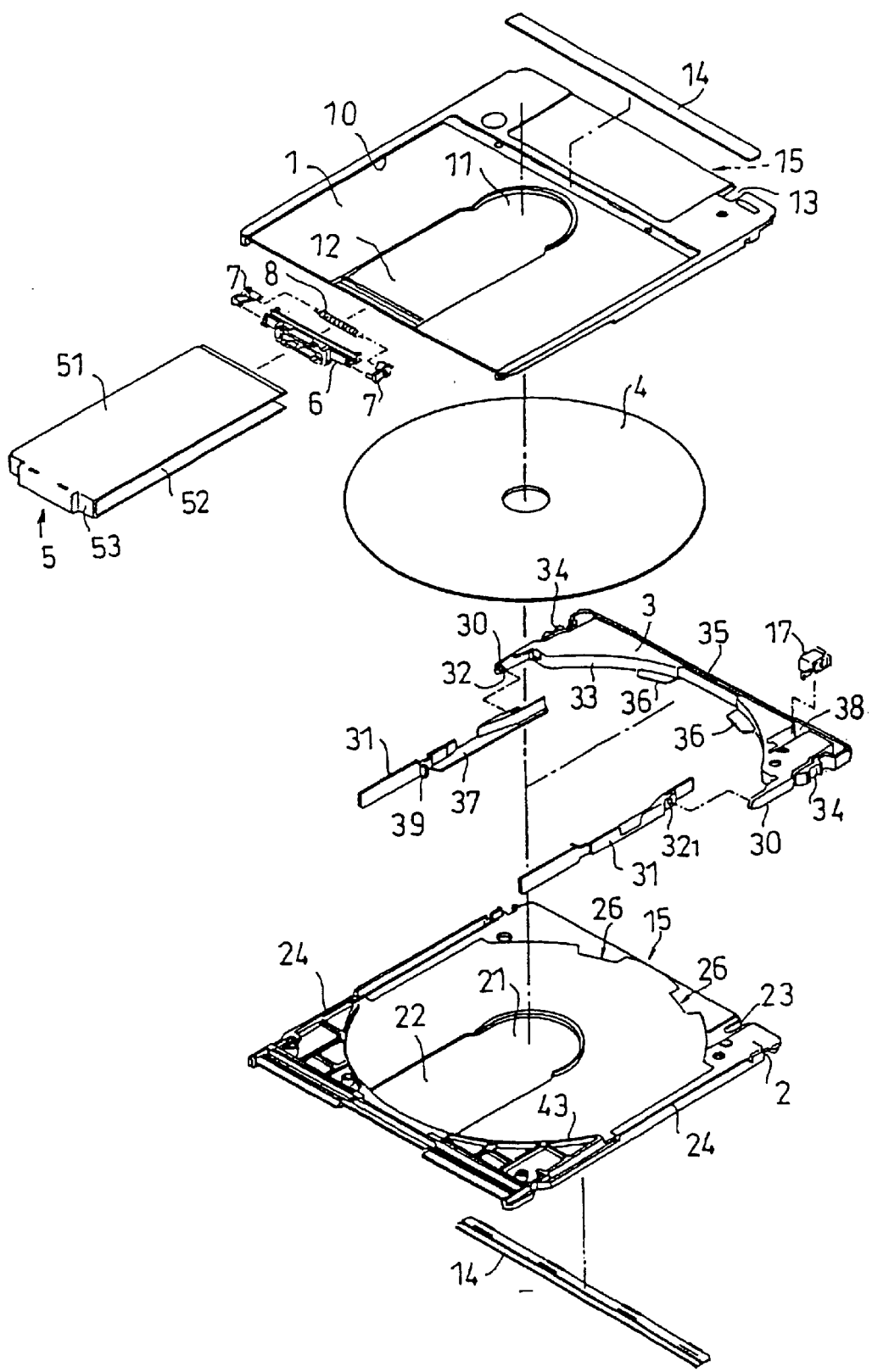
FIG. 1 is a perspective view in an exploded state of a disk cartridge according to a first embodiment of the present invention.

Preferred embodiments of the disk cartridge of the present invention will be described with reference to the drawings.

A first embodiment of the present invention will be described by taking a disk cartridge for accommodating a photo disk shown in FIGS. 1 to 5 as an example.

A casing is composed of an upper casing 1 and a lower casing 2. The casing is adapted to receive therein in a rotatable manner a disk-like medium as an information medium capable of recording and reproducing in its both surfaces or a single surface. The upper and lower casings 1, 2 are provided with openings such as driving shaft insertion holes 11, 21 into which the driving shaft of a recording/ reproducing device is inserted to drive the disk-like medium 4 and head insertion holes 12, 22 into which a head is inserted to perform recording or reproducing. A shutter 5 is attached to the casing comprising the upper and lower casings 1, 2 to open or shut the openings. The shutter 5 is extended so as to bridge both front and rear surfaces of a front portion of the easing so that it can slide in a shutter sliding region 10 which is slightly lower in level than the front surface of the casing. The shutter 5 comprises an upper plate 51, a lower plate 52 and a connecting plate 53 for connecting the upper and lower plates 51, 52 so that the shutter has a substantially channel-like form in cross section. The shutter 5 is provided with a first slider 6 and a second slider 7 useful for sliding and guiding and an elastic member 8 such as a spring which urges the shutter 5 in a direction of closing. The sliders have hook-like projections which are fitted to a groove formed in an inner face of the casing so that the shutter 5 is movable between a closing state to an opening state and vise versa.

Guide plates 14 for guiding each free edge of the upper plate 51 and the lower plate 52 of the shutter are attached to front surfaces of the upper casing 1 and the lower casing 2 by means of melt-bonding or adhesive so as to assure a smooth sliding of the shutter 5 and increase safety by controlling the free edges of the shutter 5.

A disk-like medium taking-out port 15 for taking out the disk-like medium 4 is formed in a side face of the casing, which opposes the side of the casing provided with the shutter 5, and a cover member 3 for opening and shutting the taking-out port 15 is disposed slidably in a manner of capable of sliding.

In either of upper and lower casings 1, 2, for example, in the lower casing 2, guide grooves 24 are formed which can guide arms 30 formed at both sides of the cover member 3 and slide members 31 connected to the arms 30. The cover member 3 is fitted in a manner of sliding into the guide grooves 24. Accordingly, the cover member 3 can be opened by drawing it from the casing. Namely, the cover member 3 can be drawn in an opposite direction to the shutter 5. A distance of drawing the cover member 3 is within a range of not less than the radius of the disk-like medium. In this case, a captive mechanism is formed in the casing to prevent the disk-like medium 4 from freely dropping.

Figure 2:
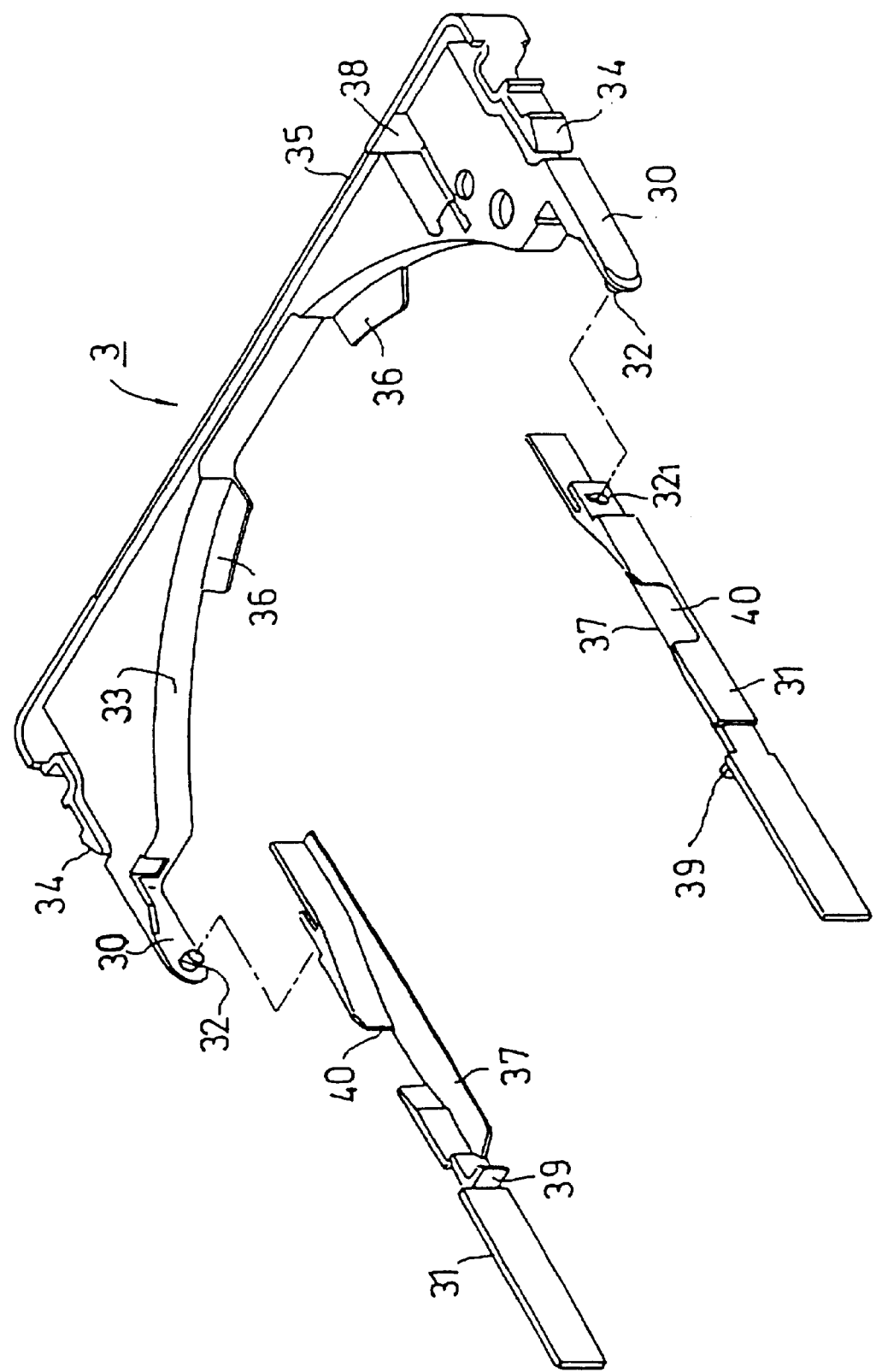
FIG. 2 is an enlarged perspective view in an exploded state of a cover member and slide members in the first embodiment.
Figure 3A:
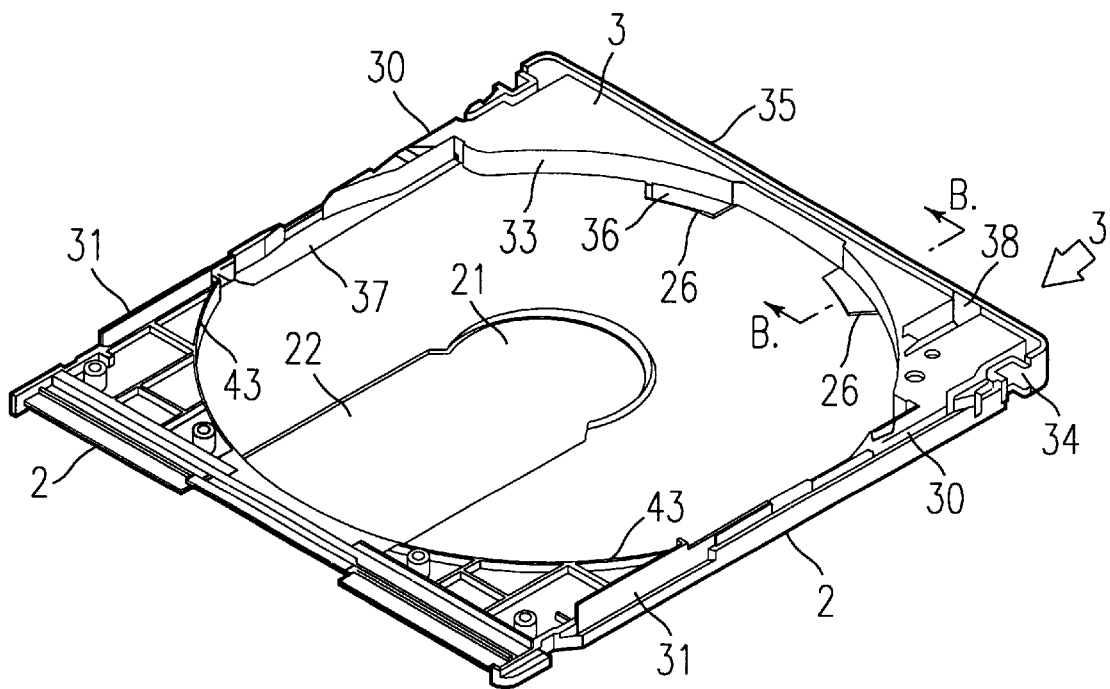
FIG. 3a is a perspective view of the cover member and the slide members which are assembled to a lower casing in the first embodiment.

The cover member 3 has an outside-facing side wall 35 which serves as a finger-touch portion for drawing the cover member and which forms a side wall of the disk cartridge when the cover member 3 is in a state of completely received in the disk cartridge to close the disk-like medium taking-out port 15. The cover member also has a circular arc wall 33 extended toward the inside of the outside-facing side wall 35, the arms 30 provided at both sides of the outside-facing side wall 35, the slide members 31 each connected to each of the arms 30 by means of a pivot shaft 32, and tongue-like projections 36 extended from the circular arc wall 33 so as to define a disk-like medium receiving portion which is extended between the outside-facing side wall 35 and the arms 30, 30 at both sides thereof to support a lower face of the disk-like medium. Further, the cover member 3 is provided with a pair of locking portion 34 for locking the cover member 3 to the casing in a state of shutting the taking-out port 15, and an erroneous erasing preventing portion 38, into which an erroneous erasing preventing member 17 is inserted, at a position close to the outside-facing side wall 35. The arms 35 and the slide members 31 are fitted in a manner of sliding in the casing along its side walls (FIGS. 2 and 3).

In the cover member 3, since the circular arc wall 33 is formed in correspondence to the outer periphery of the disk-like medium 4, it serves to determine a position of the disk-like medium when the cover member 3 is in a closed state, i.e., the disk cartridge is used in a recording/reproducing device. Two tongue-like projections 36 are extended from a lower edge of the circular arc wall 33. Since an inner space defined by the circular arc wall 33 is a space for holding the disk-like medium, it is not preferable to increase the thickness of the casing, including the cover member 3, in its entirety. If a bottom plate for holding the disk-like medium is provided in the disk-like medium receiving portion, the wall thickness of the lower casing 2 is unavoidably thin so that the rigidity is decreased. The tongue-like projections for supporting the disk-like medium are relatively small projections and accordingly, the thickness of the projections can be determined to be thin. Therefore, it is possible to increase the thickness of the lower casing at portions corresponding to the tongue-like projections. Thus, the rigidity of the casing is improved by assuring the thickness of the casing. Further, a defective molding such as a curve, a deformation or short molding in a molded product can be prevented.

The cover member 3 having the tongue-like projections 36 for supporting the disk-like medium is provided with a pair of slide members 31 connectable to the arms 30 of the cover member 3 wherein a disk supporting portion 37 is provided in each of the slide members 31 so as to oppose to each other so that the disk supporting portions can hold the disk-like medium 4 from its lower surface when the disk-like medium is to be placed, and they prevent the disk-like medium from coming off.

Each of the slide members 31 had a bearing hole $32_1$, the above-mentioned disk supporting portion 37 and an L-shaped engaging portion 39 adapted to move the disk-like medium 4 when the cover member is drawn. The pair of slide members 31 and the cover member 3 are rotatably connected by means of pivot shafts 32 of the arms 30 and the bearing holes $32_1$ so that the cover member 3 can be folded downward in drawing the cover member whereby the disk-like medium 4 can easily be taken out (FIG. 2). In this embodiment, the cover member 3 is produced separate from the slide members 31, however, the cover member 3 may be produced in one piece with the slide members 31 so as to be capable of folding by utilizing a hinge mechanism.

The tongue-like projections are disposed with a space therebetween symmetrically with respect to a centerline of the cover member in a direction of sliding movement.

In FIG. 4, an inner surface of the lower casing 2 is provided with recessed portions 26 at positions facing the disk-type medium 4, at which the tongue-like projections 36 formed in the cover member 3 are passed. Each of the upper and lower casings 1, 2 is provided with a label area 25 in an outer surface at a side of receiving the cover member 3 at a level slightly lower than the outer surface. The tongue-like projections 36 of the cover member 3 are passed on parts of the inner surface which correspond to the label area 25 of the lower casing 2, the tongue-like projections having a thickness thinner than the thickness of the lower casing 2.

In a state that the cover member 3 is entirely housed in the casing, the disk supporting portions 37 are at both sides of the disk-like medium 4 in the upper and lower casings 1, 2 with respect to the center of the medium 4 whereby a stable holding condition for the disk-like medium 4 can be maintained. Further, when the cover member 3 is drawn, the disk-like medium 4 can easily be brought to the outside by means of the disk supporting portions 37 and the engaging portions 39.

In the casing for holding the cover member 3, a circular arc rib 43 is formed in the lower casing. The circular arc rib 43 and the circular arc wall 33 formed in the cover member so as to correspond to the outer periphery of the disk-like medium 4 have the same axial center, and they form the disk-like medium receiving portion and provide a stable receiving condition for the disk-like medium 4.

It is preferable that the cover member 3 and the slide members 31 are molded with a resin having good sliding property such as polyacetal resin. The upper and lower casings 1, 2 are generally molded with a resin such as ABS resin. However, when the upper and lower casings 1, 2 are to be bonded by ultrasonic waves and if the same kind of resin as the upper and lower casings is used for the cover member 3, the cover member 3 is bonded to the upper and lower casings 1, 2. Accordingly, a resin different from that for the upper and lower casings 1, 2 should be used for the cover member 3.

The slide members 31 of the cover member 3 are moved in slide contact with inner surfaces of the upper and lower casings 1, 2. In this case, it is preferable to form notch portions 40 by cutting parts of the slide members 31 so that an area for the disk-like medium receiving portion is increased.

Recesses 13, 23 for allowing the insertion of an erroneous erasing member 17 are formed in the upper and lower casings 1, 2, and an erroneous erasing preventing portion 38 is formed in the cover member 3. The erroneous erasing preventing member 17 can be inserted in the erroneous erasing preventing portion 38 so that a user can selectively determine a recording state or a non-recording state.

When the cover member 3 is to be drawn from the upper and lower casings 1, 2, the locking portions 34 formed at both sides of the cover member 3 are pressed inwardly to cause elastic deformation of the locking portions 34 to thereby release a locking state. Then, drawing portions formed at a rear side of the cover member 3, i.e., corner portions at a rear side of the cover member 3 are touched with fingers to draw the cover member 3, whereby the disk-like medium receiving portion of the cover member 3 can be exposed outside by the guiding/sliding effect of the slide members 31. Namely, by simply drawing the cover member 3, the disk-like medium 4 comes out from the casing, and accordingly, exchanging operations for the disk-like member can be easy.

A guide portion is formed at a free end side of each of the slide members 31 which are connected to the both arms 30 of the cover member 3, and each of guide portions is fitted to each of the guide groups 24 of the upper and lower casings 1, 2 whereby the cover member 3 can be slid smoothly in a stable manner, and can be stopped at a predetermined position.

The cover member 3 is set in the upper and lower casings 1, 2 so that it is movable in a distance slightly longer than the radius of the disk-like medium 4. For example, the cover member is assembled in the upper and lower casings 1, 2 so that it is movable in a distance longer than a distance (r+R+α) which is the sum of a radius r of a driving shaft insertion hole corresponding to the center of the disk-like medium 4, a radius R of the disk-like medium and a distance α between an inner surface of a side wall of the cartridge and the outer periphery of the disk. Such arrangement allows to take out the disk-like medium 4 from the disk-like medium receiving portion by picking the central hole and the outer periphery of the disk-like medium 4 with fingers when the cover member 3 is drawn.

Further, in order to prevent the cover member 3 from coming-off from the upper and lower casings 1, 2 when the cover member 3 is drawn, a projection may be formed in the upper casing 1 which contacts a rear edge of the guide portion formed in each of the slide members 31 of the cover member 3. The provision of the projections is made in the consideration as follows. When the sliding movement of the cover members is restricted by the guide groups 24 formed in the casings, the cover member 3 may come off from the casing by means of only the engagement between the guide portion and the guide group 24 when the cover member 3 is strongly pulled. Further, it is effective to obtain the drawing operation of the disk-like medium 4 by means of the disk drawing portion provided in the cover member 3.

Figure 3B:
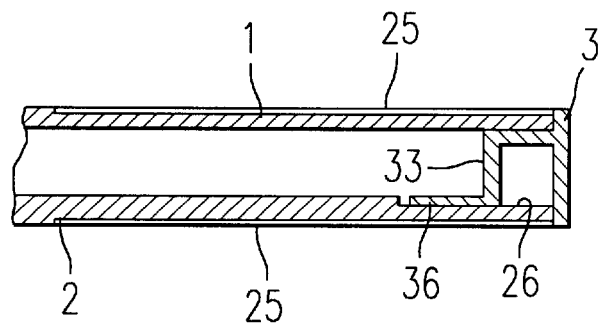
FIG. 3b is an enlarged longitudinal cross-sectional view taken along a line B—B in FIG. 3a wherein an upper casing is also shown.
Figure 5:
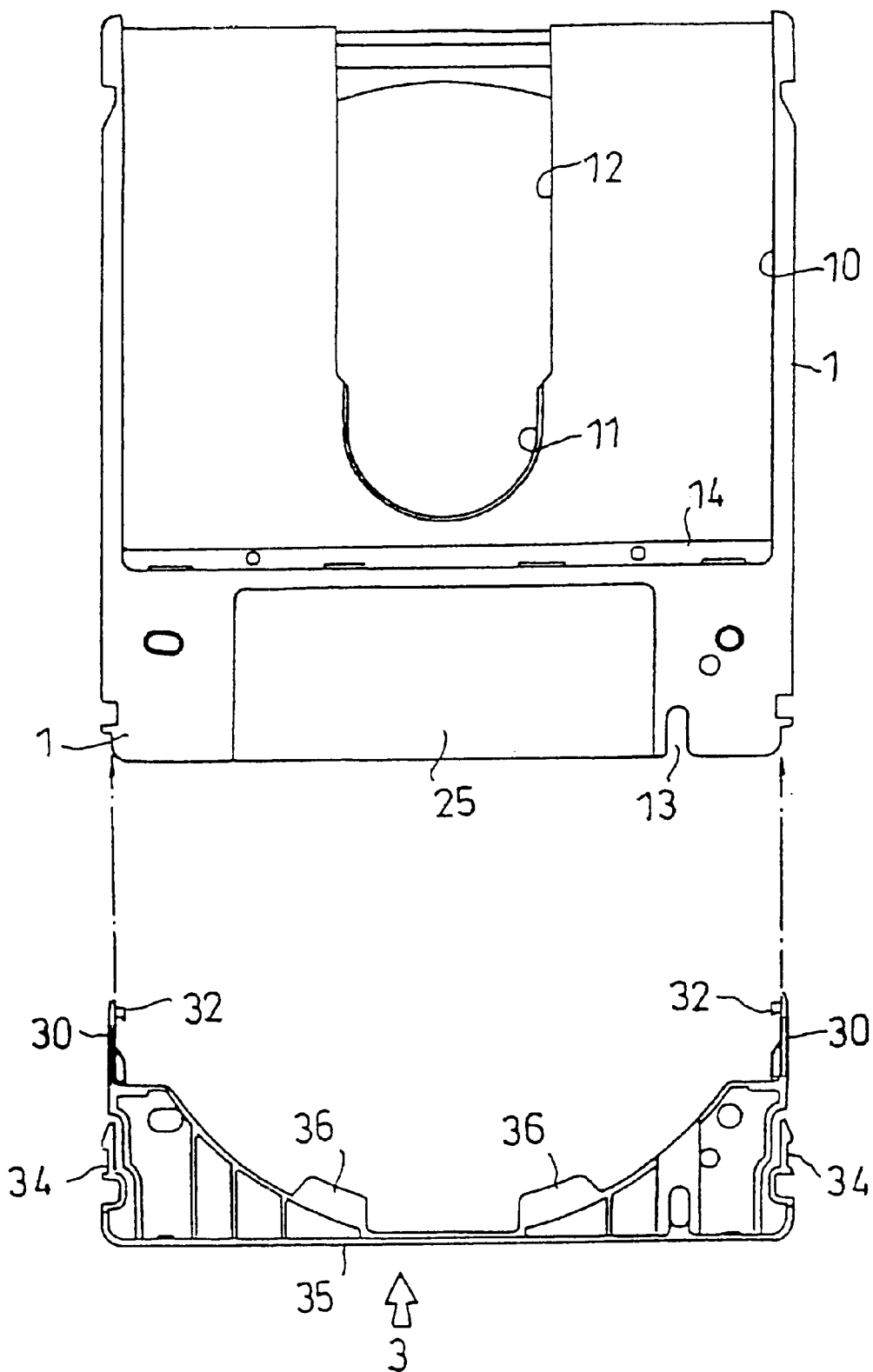
FIG. 5 is a plan view showing a state of separating the cover member from the upper casing shown in FIG. 1.
Figure 6:
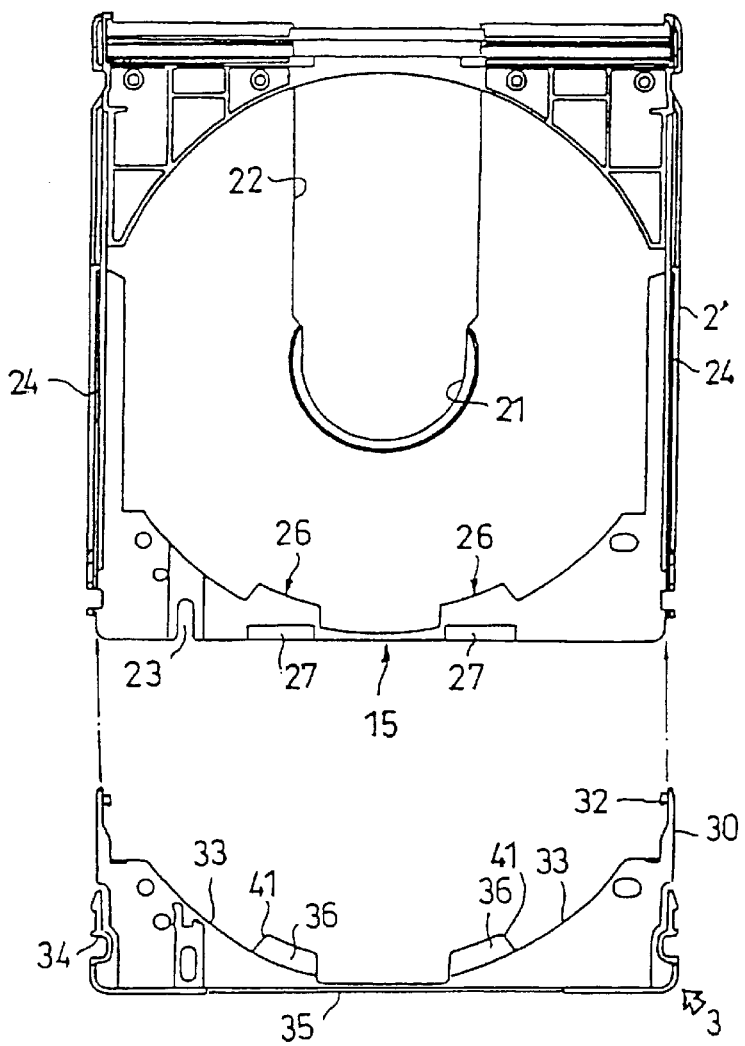
FIG. 6a and FIG. 6b are respectively a plan view and a side view of a second embodiment of the disk cartridge according to the present invention, wherein the views correspond to FIGS. 4a and 4b.
Figure 6:
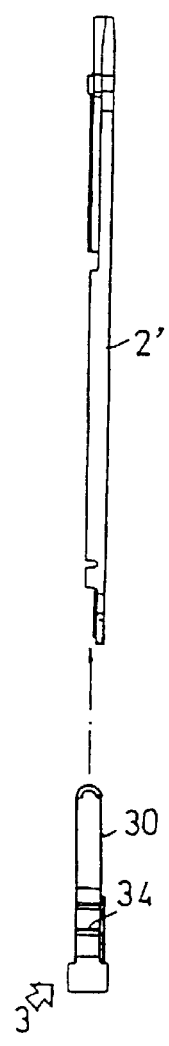
Figure 7:
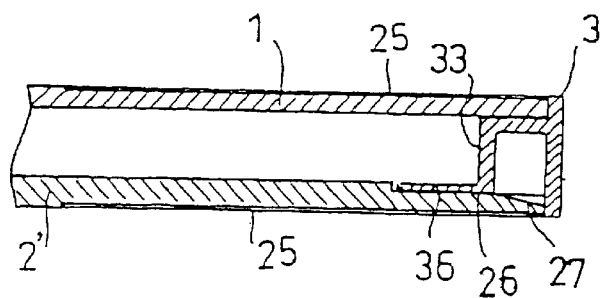
FIG. 7 is an enlarged longitudinal cross-sectional view of the second embodiment wherein the view corresponds to FIG. 3b.

FIGS. 6 and 7 show a second embodiment of the present invention wherein FIG. 6 corresponds to FIG. 4 and FIG. 7 corresponds to FIG. 3b. In the second embodiment, only a lower casing 2' which corresponds to the lower casing 2 in the first embodiment, is different, and the upper casing 1 and the cover member 3 are the same as those of the first embodiment. In FIGS. 6 and 7, the same reference numerals designate the same or corresponding parts of the first embodiment.

In edge portions of an inner surface of the lower casing 2', slopes 27 are formed at positions facing the disk-like medium taking-out port 15 wherein the level of the inner surface of the lower casing is gradually decreased toward the disk-like medium taking-out port 15. The slopes 27 are formed in regions where the tongue-like projections 36 are passed at the time of opening and shutting the cover member 3. In this embodiment, two slopes 27 are formed in correspondence to the tongue-like projections 36 and each of the slopes 27 has a width slightly larger than a lateral width of the tongue-like projections 36. The thickness of the slopes 27 at an edge portion facing the disk-like medium taking-out port 15 is about half as large as the thickness of the recessed portions 26.

When the cover member 3 is closed, the tongue-like projections 36 of the cover member 3 pass on the slopes 27 of the lower casing 2' whereby a danger that the tongue-like projections 36 hit an edge of the disk-like medium taking-out port 15 of the lower casing 2' can certainly be prevented. In particular, the tongue-like projections 36 have a relatively thin wall thickness, and therefore, they are easily curved. However, even when the tongue-like projections 36 are slightly curved downward, they can certainly be guided on the inner surface (i.e., on the recessed portions 26) of the lower casing 2' by means of the slopes 27.

In this embodiment, the width of the slopes 27 is larger than the lateral width of the tongue-like projections 36. However, it is not always necessary to from the width of the slopes to cover entirely the width of the tongue-like projections 36. For example, each of the slopes 27 may be formed in an area where a front edge portion 41 of the tongue-like projections 36 passes, when the cover member 3 is retracted (FIG. 6a).

The disk cartridge according to a third embodiment of the present invention will be described with reference to FIGS. 8 to 12. The general construction of the disk cartridge of the third embodiment is substantially the same as the first embodiment shown in FIGS. 1 to 3 except that slide members are produced separate from cover member. In FIGS. 8 to 12, the same reference numerals as in FIGS. 1 to 7 designate the same or corresponding parts. Accordingly, description of the same or corresponding parts is omitted.

Figure 8:
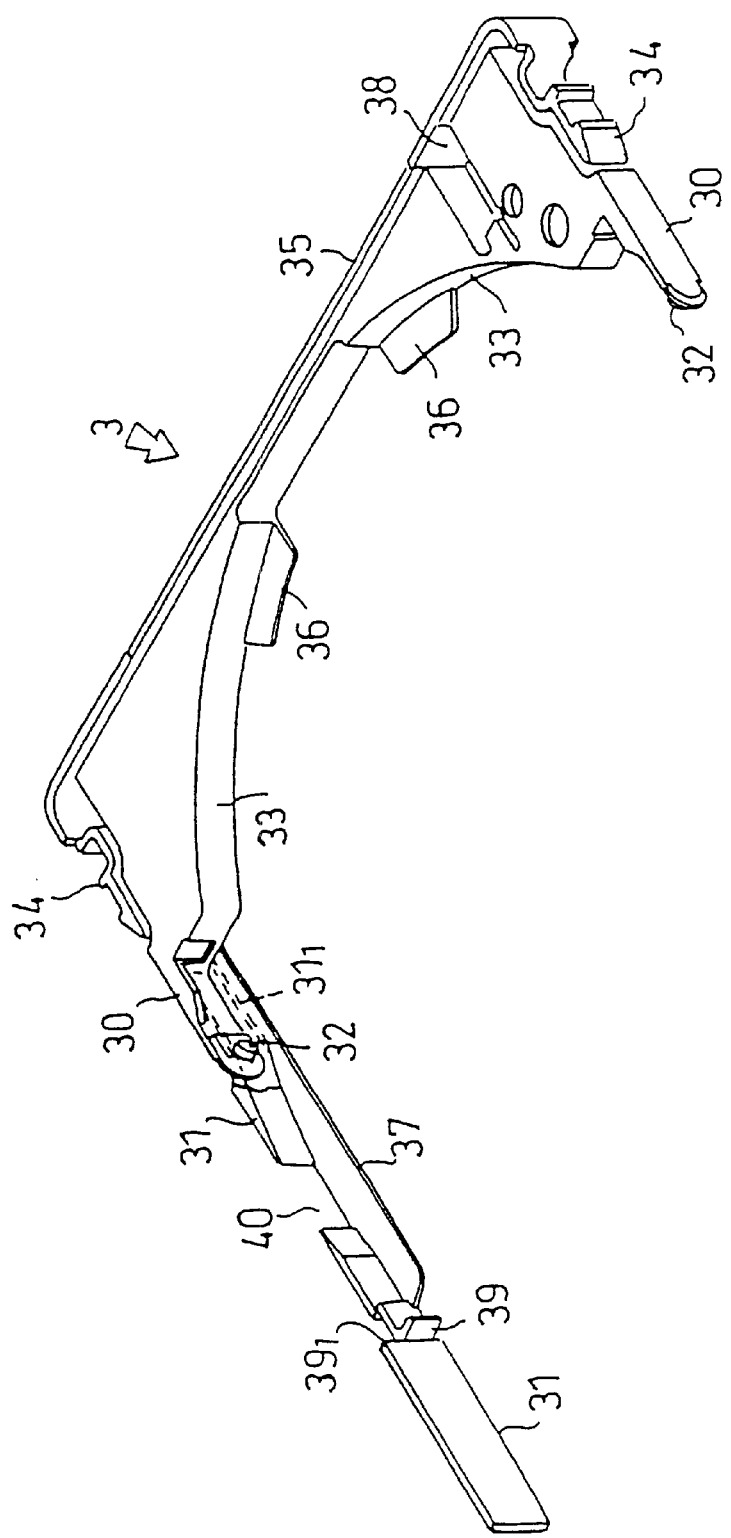
FIG. 8 is a perspective view partly omitted of a cover member of the disk cartridge according to a third embodiment of the present invention.

In FIG. 8, each of slide members 31 has a bearing hole $32_1$, a disk-like medium supporting portion 37 and an engaging portion 39 which serves to move the disk-like medium 4 when the cover member 3 is drawn. Each of the sliding members 31 is rotatably connected to each of arms 30 formed in a cover member 3 by means of a pivot shaft 32 so that when the cover member 3 is drawn from the disk cartridge, the cover member 3 can be folded downward to provide a state of easily taking-out of the disk-like medium 4.

In this embodiment, the cover member 3 and the slide members 31 are produced separately, and the bearing hole $32_1$ into which the pivot shaft 32 is fitted, is formed in each of the slide members 31 so that the cover member 3 is turned around the pivot shafts 32. The pivot shafts 32 are fitted to the bearing holes $32_1$ from both outer sides of the slide members 31 so that free ends of the pivot shafts 32 are not contact both side walls of the casing. Further, each of the free ends of the pivot shafts 32 is provided with a projection $32_2$ projecting in a direction of the radius of the pivot shaft. A cut portion $32_3$ is formed in the bearing hole $32_1$ of each of the sliding members 31 so as to correspond to the projection $32_2$ (FIG. 9).

The provision of the projection $32_2$ and the cut portion $32_3$ is to prevent the cover member 3 from coming-off from the slide members 31. The projection $32_2$ and the cut portion $32_3$ are so constructed that when the cover member 3 is raised to an angle of about 90°, the cover member 3 is assembled to or disassembled from the casing. Since the cover member 3 is generally raised in actual use, there is no risk that the cover member 3 comes off.

Figure 9:
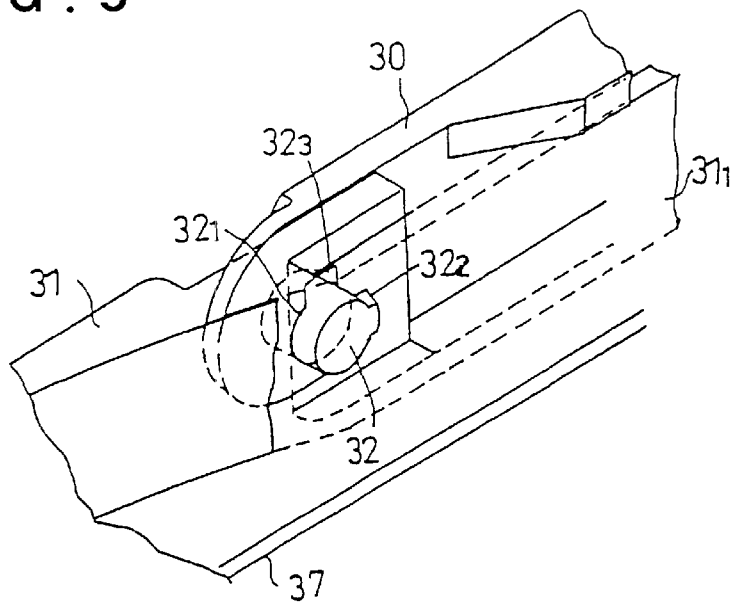
FIG. 9 is an enlarged perspective view of an important portion of the cover member shown in FIG. 8.
Figure 10:
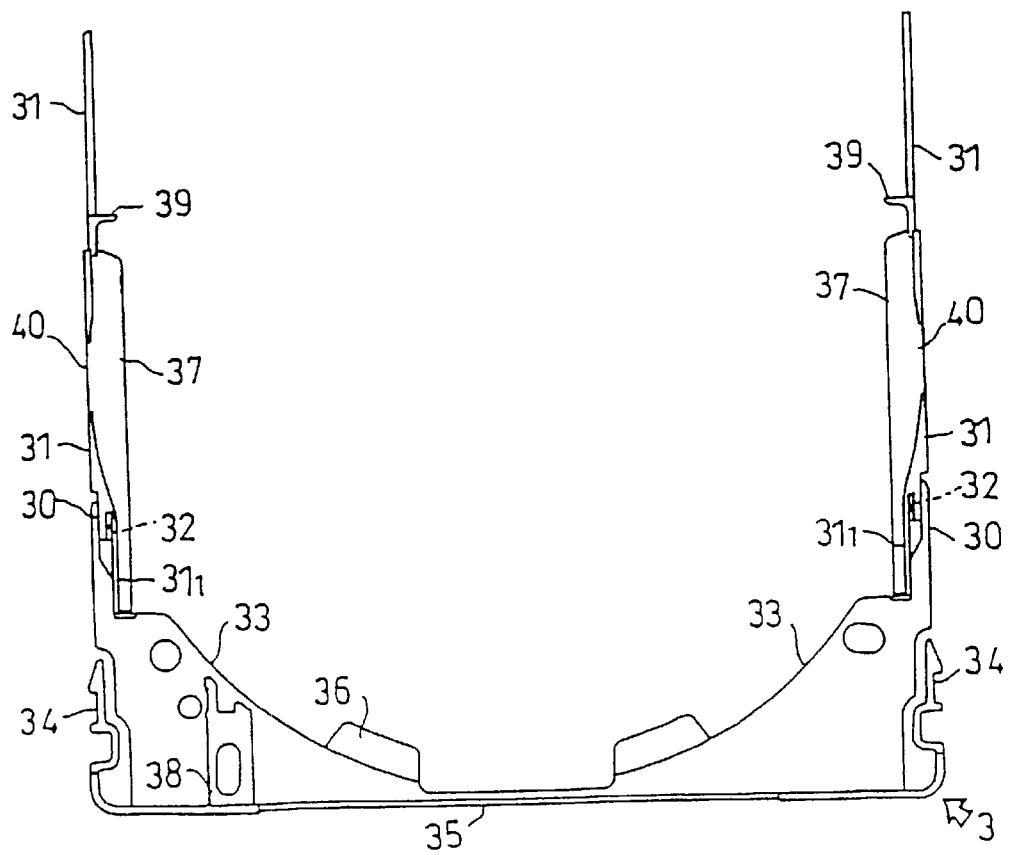
FIG. 10 is a plan view showing an assembled state of the cover member and slide members shown in FIG. 8.
Figure 11:
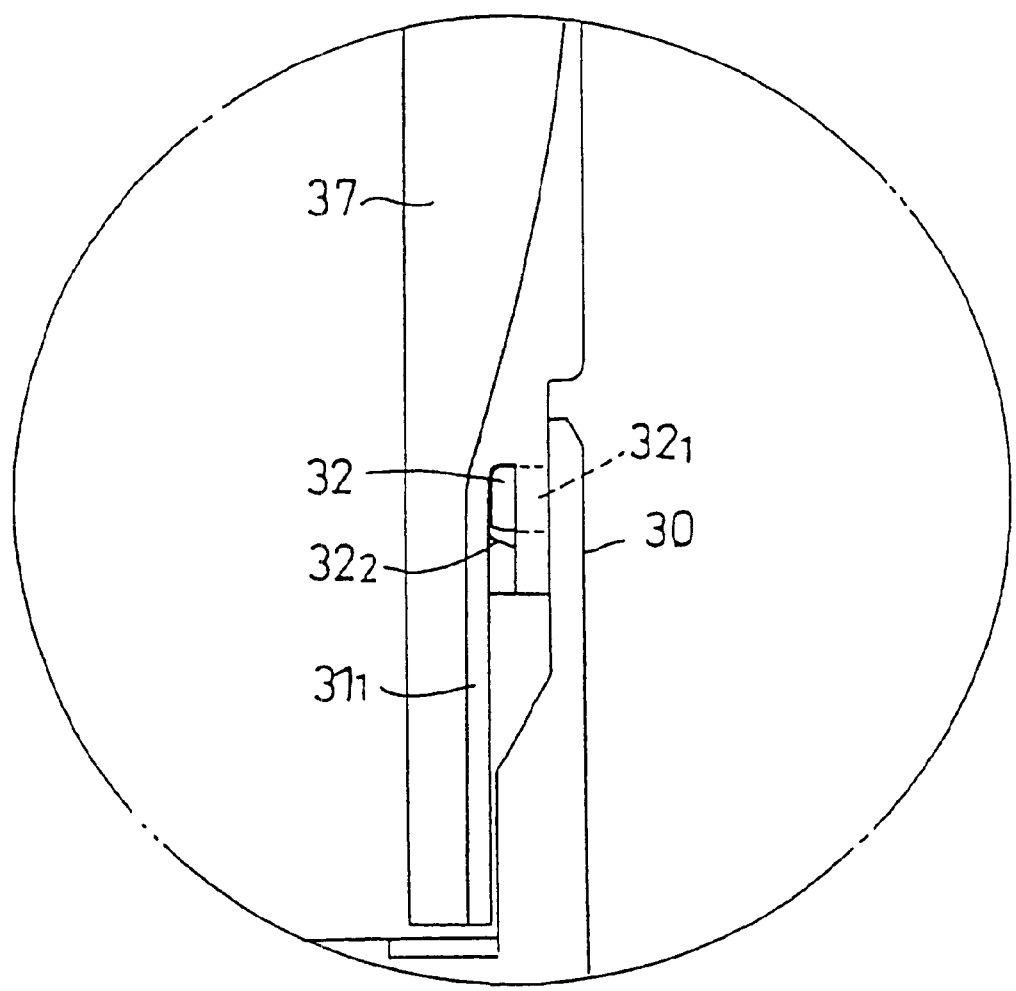
FIG. 11 is an enlarged plan view showing a folding portion in FIG. 10.
Figure 12:
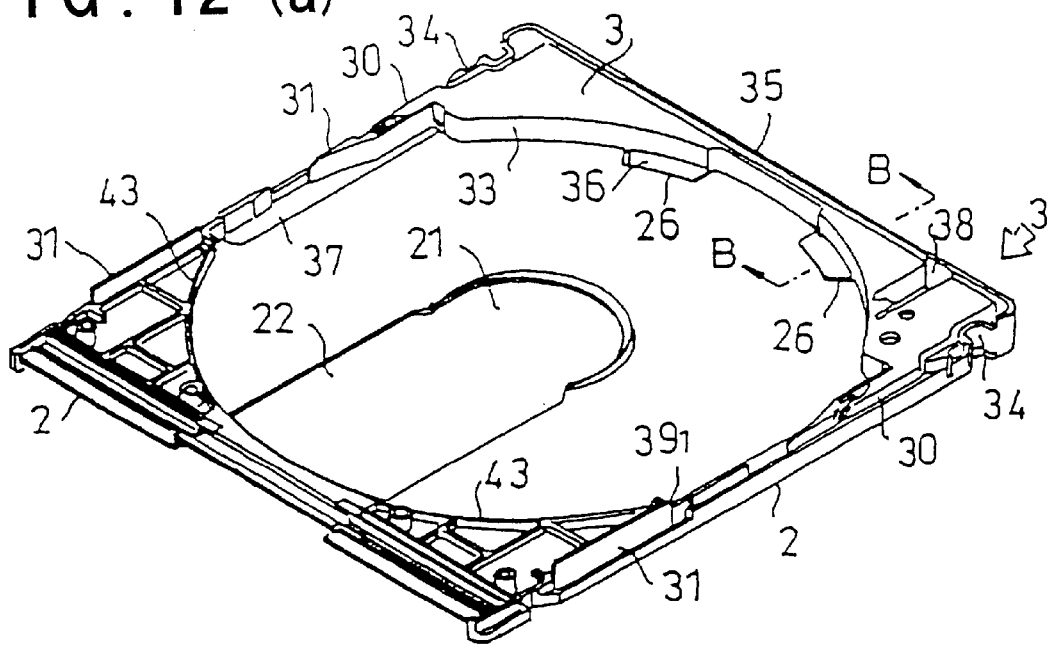
FIG. 12a is a perspective view showing a state of assembling the cover member and slide members to a lower casing in the disk cartridge of the third embodiment of the present invention.
FIG. 12b is an enlarged longitudinal cross-sectional view taken alone a line B—B in FIG. 12a wherein an upper casing is shown.
FIG. 12c is an enlarged side view of an important portion of the disk cartridge of the third embodiment of the present invention.
Figure 12:
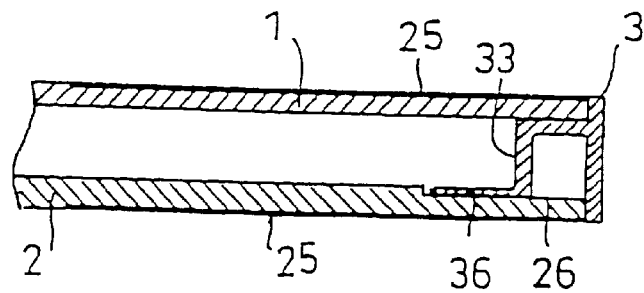
Figure 12:
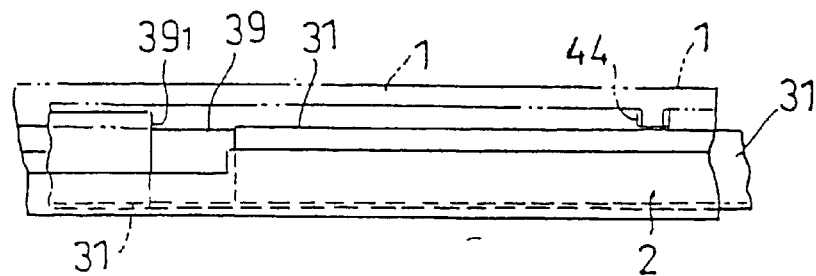
Figure 13:
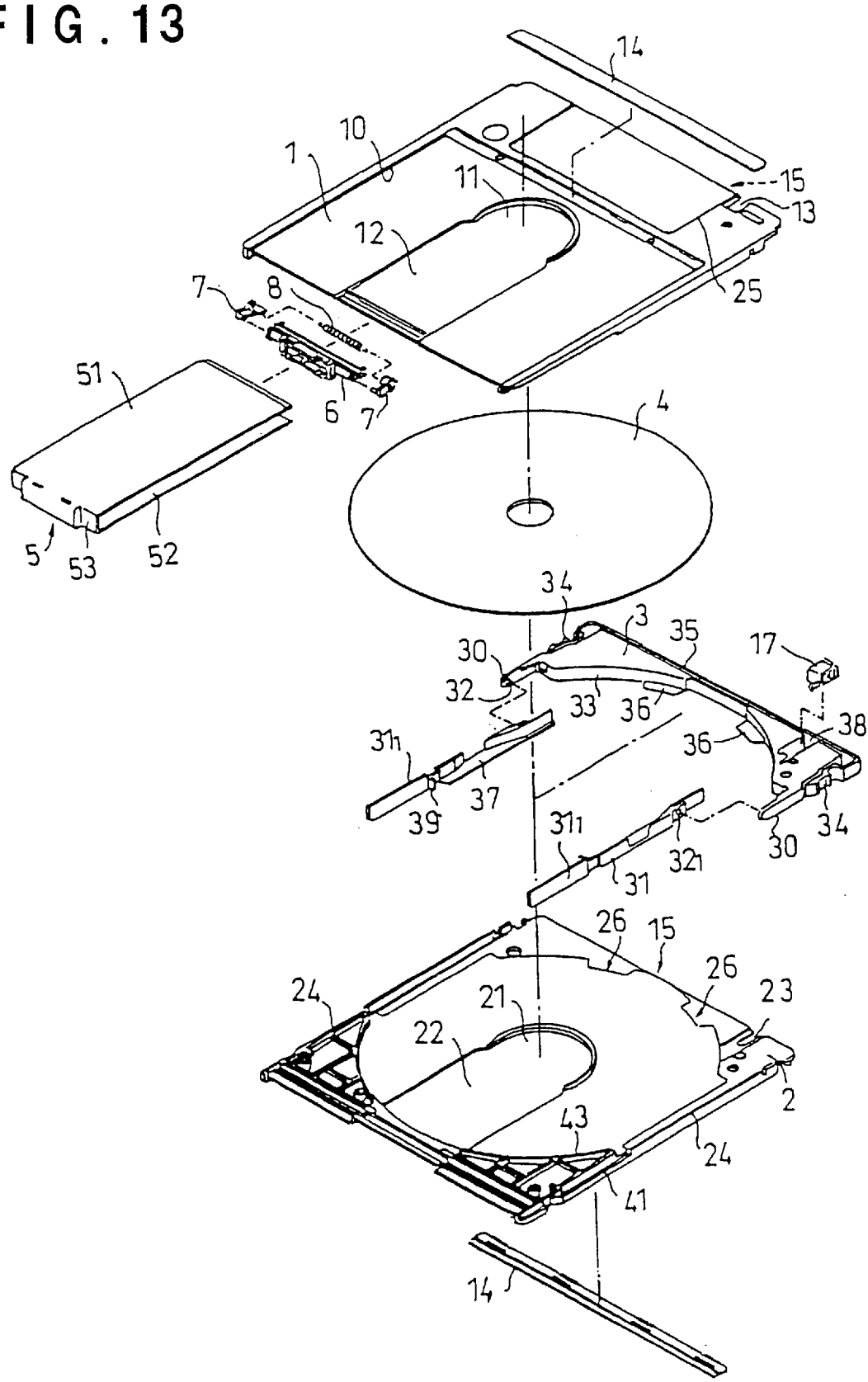
FIG. 13 is a perspective view in an exploded state of the disk cartridge according to a fourth embodiment of the present invention.
Figure 14:
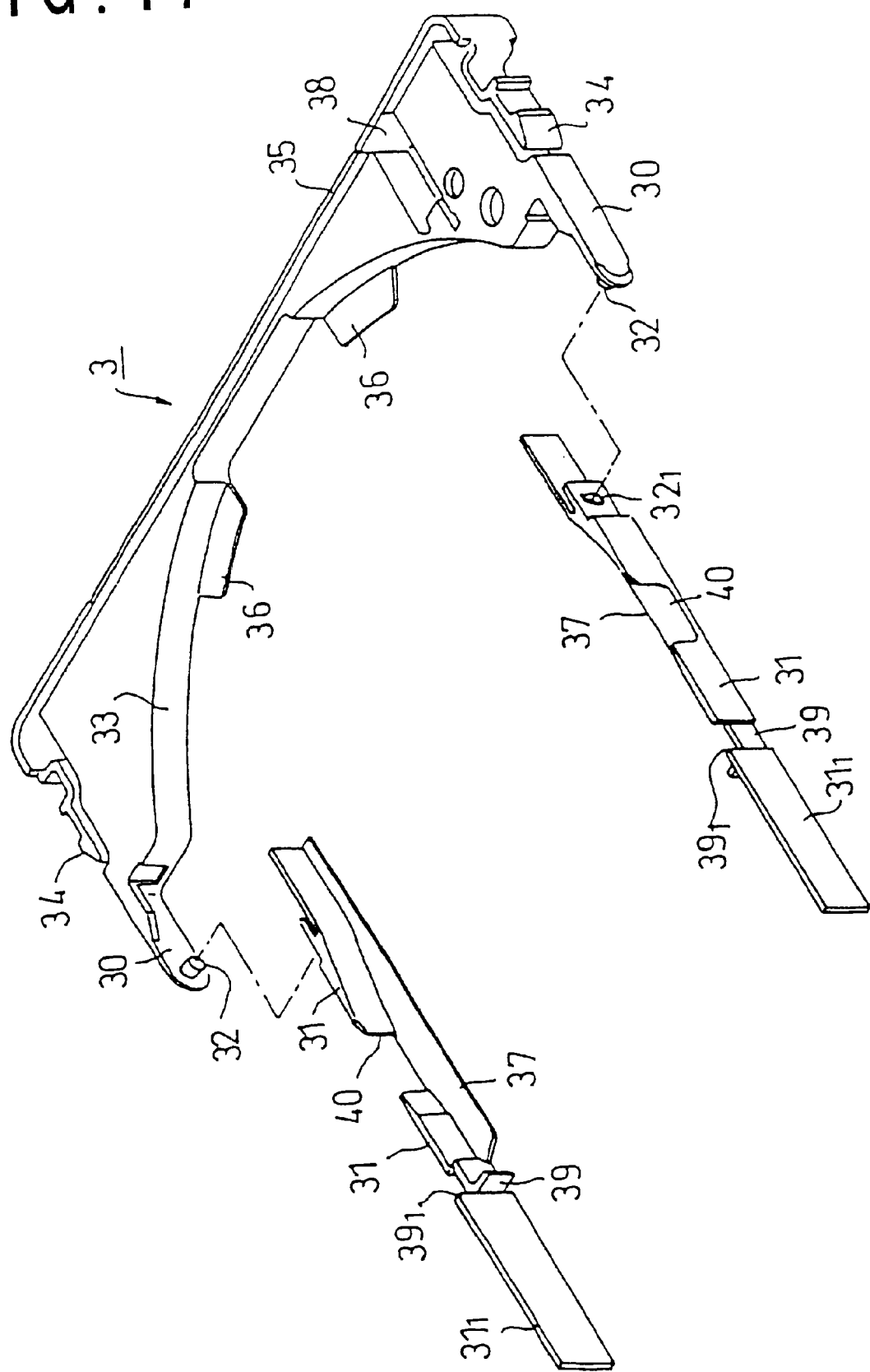
FIG. 14 is a perspective view in an exploded state of a cover member and slide members shown in FIG. 13.

Further, as shown in FIGS. 9 and 10, a partition wall $31_1$ is formed integrally with each of the slide members 31, which are connected to the cover member 3, to face the inside of the bearing hole $32_1$ so that the entry of dust produced from the pivot shaft 32 or the contact of the surface of the free end of the pivot shaft 32 to the disk-like medium 4 is prevented, and the dropping of the disk-like medium 4 by its own weight is prevented.

The partition wall $31_1$ has the same center of radius of coverture as the radius of the circular arc wall 33 formed in the cover member 3 whereby a play of the disk-like medium 4 can correctly be set.

In the same manner as the first embodiment, the cover member 3 slides in a distance slightly larger than a length corresponding to the radius of the disk-like medium 4 wherein the slide members 31 are moved in the guide grooves 24 provided at the side walls of the casing, and a distance of movement of the cover member 3 is determined in association with the guide grooves 24 and the slide members 31. With this, it is easy to take out the disk-like medium by picking the central opening of the disk-like medium 4 by fingers when the cover member 3 is drawn and folded by turning it around the pivot shafts. Further, since the cover member 3 and the slide members are separate bodies, there is little possibility of causing a curve or a twist in these members. As a result, the shape of molded products is good and molding properties can remarkably be improved.

In this embodiment, as shown in FIG. 12c, a projection 44 or a step portion or a stopper portion is formed in the upper casing 1, which contacts a rear edge portion $39_1$ of the guide portion extended from each of the slide members 31 of the cover member 3 when the cover member 3 is drawn from the casing. Therefore, there is no danger that the cover member 3 drops form the upper and lower casings 1, 2.

The disk cartridge according to a fourth embodiment of the present invention will be described with reference to FIGS. 13 to 17 wherein the same reference numerals as in FIGS. 1 to 7 designate the same or corresponding parts. Accordingly, description of these parts is omitted.

In the fourth embodiment, a disk-like medium taking-out port 15 is formed in a side face of the casing at a position opposing a shutter 5, and a cover member 3 for opening and shutting the taking-out port 15 is housed in the casing so as to be capable of sliding. An erroneous insertion preventing groove 41, into which an erroneous insertion preventing detection member (not shown) located in a recording/reproducing device is inserted, is formed in a side wall of the casing at a side of the shutter 5 which is opposite the disk-like medium taking-out port 15. The cover member 3 is provided with slide members 31 which are capable of sliding in guide grooves 24 formed at an inner side of left and side walls of the casing. A part of an outer side wall of the guide groove is cut out to be communicated with the erroneous insertion preventing groove 41. In a closing state of the cover member 3, a side wall of the cover member serves as a bottom wall $31_1$ for the erroneous insertion preventing groove 41, and the erroneous insertion preventing detection member in the recording/reproducing device can detect the closing state of the cover member 3.

In at least one of upper and lower casings 1, 2, for example, in a lower casing 2, the guide grooves 24 are formed to guide the slide members 31 connected to arms 30 formed at both sides of the cover member. The cover member 3 is fitted in a manner of sliding in and along the guide grooves 24 whereby the cover member 3 can be opened when it is drawn from the upper and lower casings 1, 2. Namely, the cover member 3 can be drawn in a direction opposite the shutter 5. The distance of the drawing-out of the cover member is determined to be the radius of the disk-like medium 4 or more because an engaging means is formed in the casing so that there is no danger of dropping of the disk-like medium 4.

Further, the cover member 3 is provided with side walls at its both sides to which the slide members 31 are pivoted by means of connecting means comprising a pivot shaft 32 and a bearing hole $32_1$. An outer side surface of each of the slide members 31 faces the erroneous insertion preventing groove 41. Further, a captive portion is provided in the cover member and the casing, for instance, a captive portion comprising a projection 44 formed in the upper casing 1 and a stepped portion 39 formed at a rear end of the slide member 31 for engaging with the projection 44, is provided so that a range of the movement of the both side wall portions of the cover member is restricted.

The slide members 31 respectively have disk supporting portions 37 to support a lower surface of the disk-like medium 4. The disk supporting portions 37 are formed at positions toward a side of the shutter with respect to a linear line which is in parallel to an outside-facing side wall 35 of the cover member for closing the disk-like medium taking-out port 15, the outside-facing side wall constituting a side wall of the cartridge and which passes the center of the disk-like medium 4 placed in the disk supporting portion. Namely, the disk supporting portions are formed at positions opposite the side where the cover member is provided. Further, the disk supporting portions 37 are formed at both sides with respect to the center of the disk-like medium 4 to thereby prevent the disk-like medium 4 from coming off. Even when the casing is in an inclined state, the disk-like medium 4 can easily be taken out by simply opening the cover member 3.

Figure 15A:
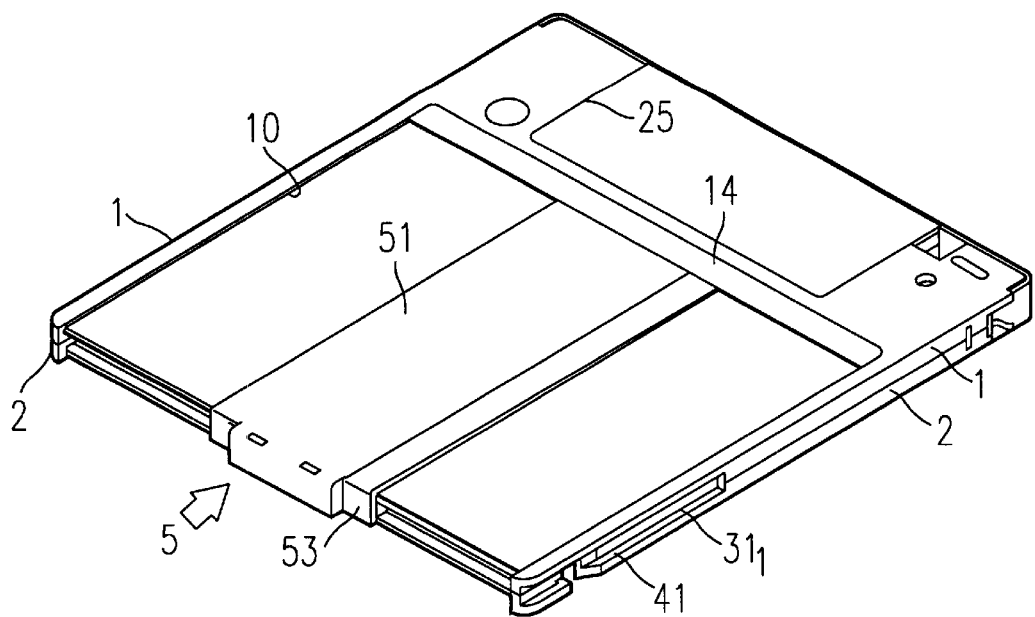
FIG. 15a is a perspective view in an assembled state of the disk cartridge shown in FIG. 13.
Figure 15B:
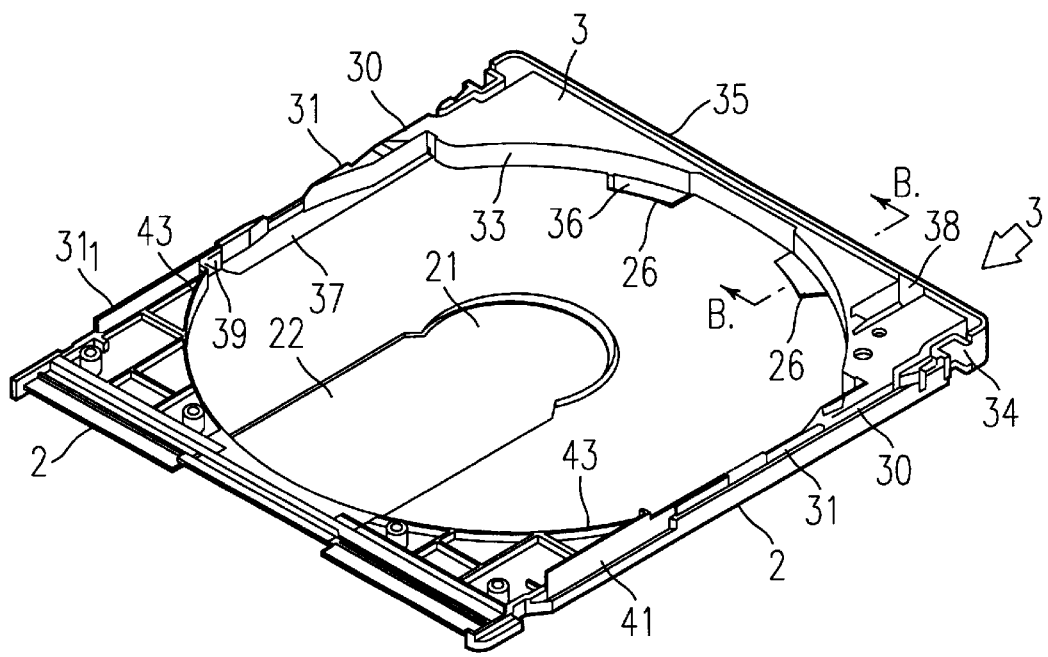
FIG. 15b is a perspective view of the disk cartridge wherein an upper casing and shutter are removed to show the inside of it.
Figure 16A:
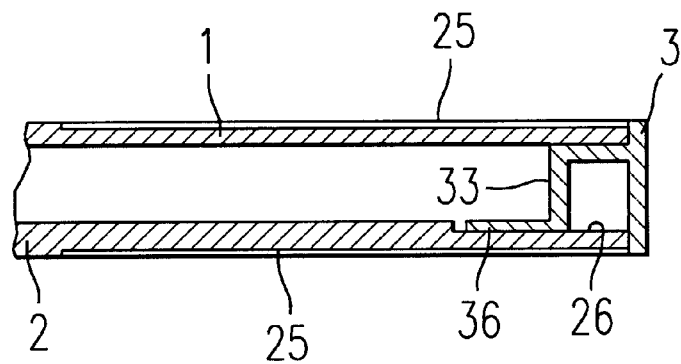
FIG. 16a is an enlarged longitudinal cross-sectional view taken along a line B—B in FIG. 15b.
Figure 16B:
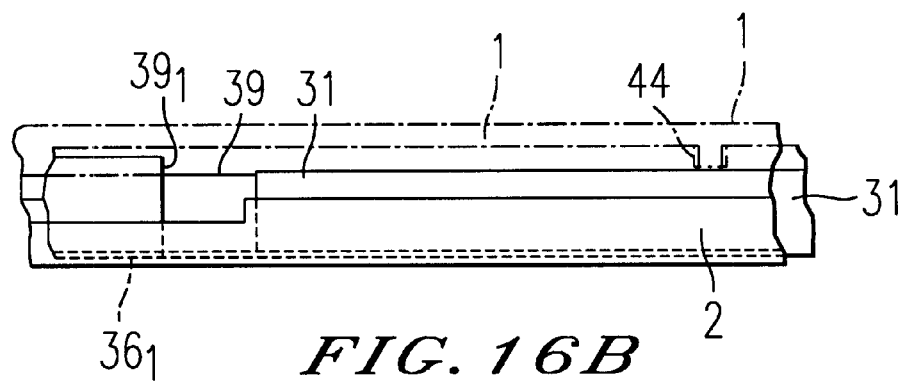
FIG. 16b is an enlarged side view of an important portion in FIG. 15b.
Figure 17:
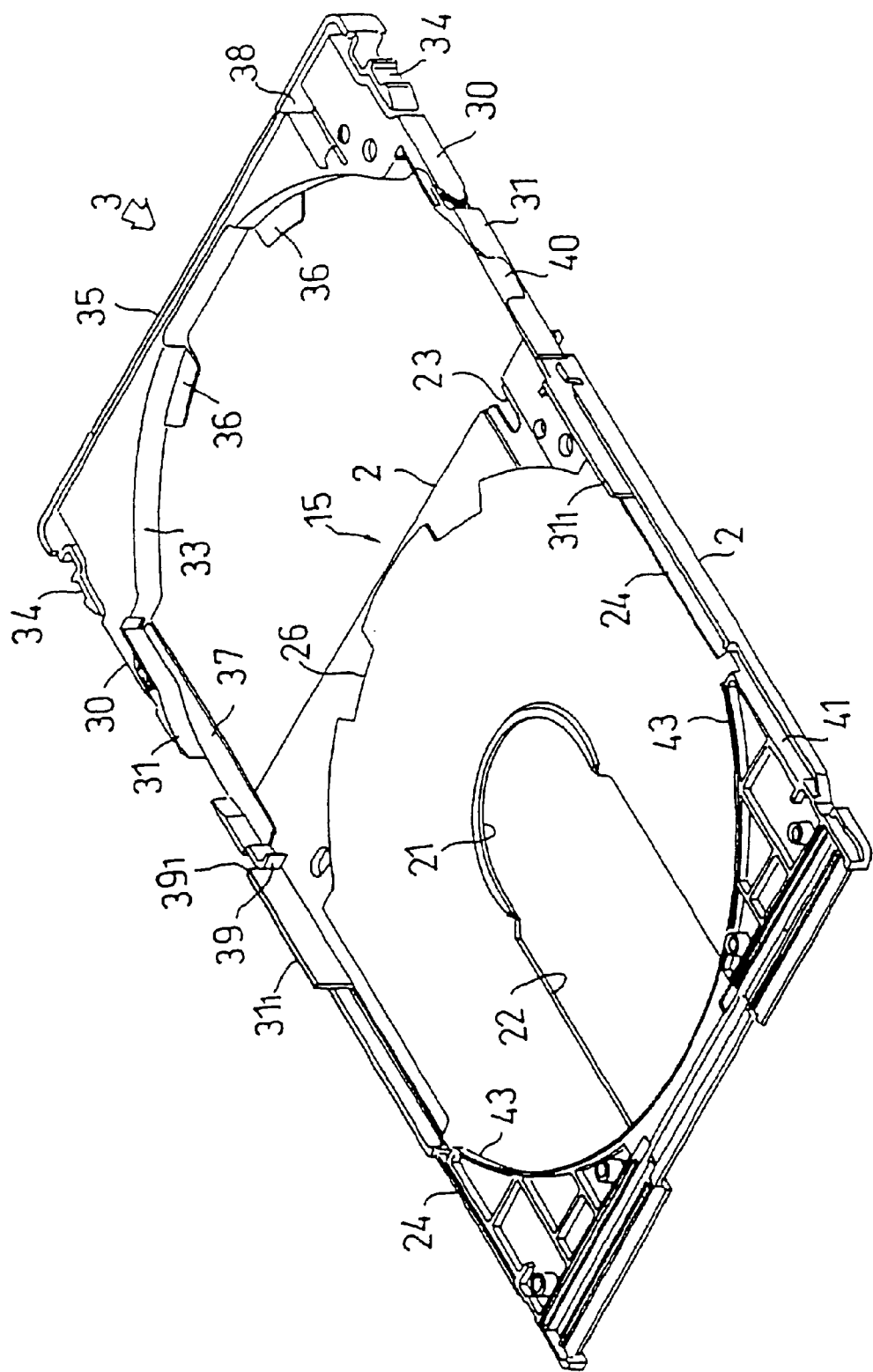
FIG. 17 is a perspective view showing a state that the cover member is drawn from a lower casing, i.e., a cover member opening state, in the disk cartridge shown in FIG. 15b.

As shown in FIG. 15, in a state of closing the cover member 3 in the casing composed of the upper and lower casings 1, 2, a side wall at an edge side of a slide member 31 constitutes a bottom wall $31_1$ of the erroneous insertion preventing groove 41 which is formed in the casing (When the cover member is formed integrally with the slide member, a side wall at an edge side of a left or right side wall of the cover member constitutes the bottom wall). With a construction that the depth of the erroneous insertion preventing groove 41 is different between a state that the cover member is closed and a state that the cover member is opened, the erroneous insertion preventing detection means in the recording/reproducing device can easily detect a state that the cover member is closed.

In order to assure the prevention of the cover member 3 from coming-off from the upper and lower casings 1, 2 when it is drawn, a captive portion such as a projection 44, a step portion or another stopper is formed in the upper casing 1 so that the captive portion contacts the guide portion, i.e., a stepped portion $31_1$ at a rear end of the portion for forming the bottom wall $39_1$, which is extended from the slide member 31 of the cover member 3.

Figure 18:
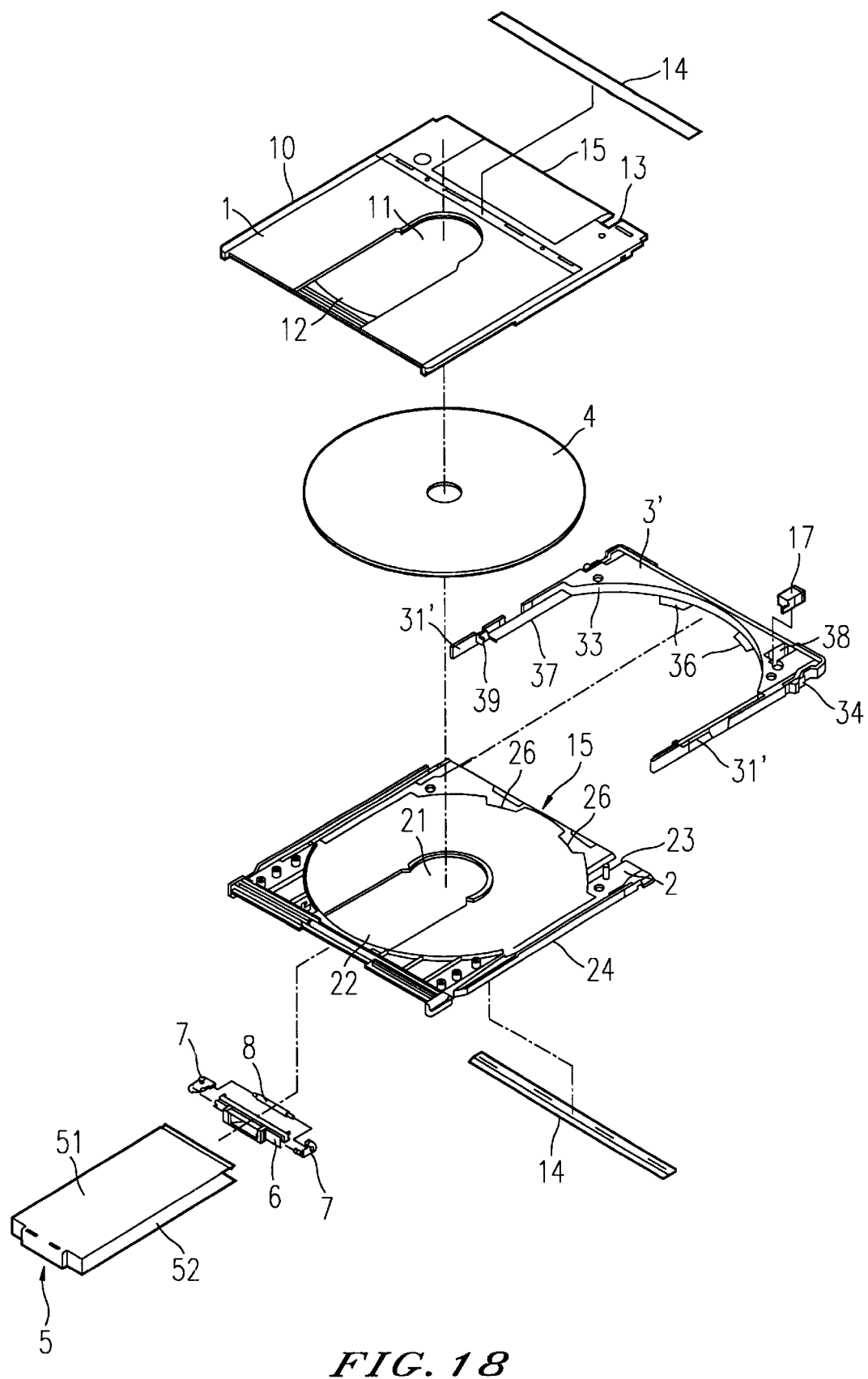
FIG. 18 is a perspective view in an exploded state of the disk cartridge according to a fifth embodiment of the present invention.
Figure 19:
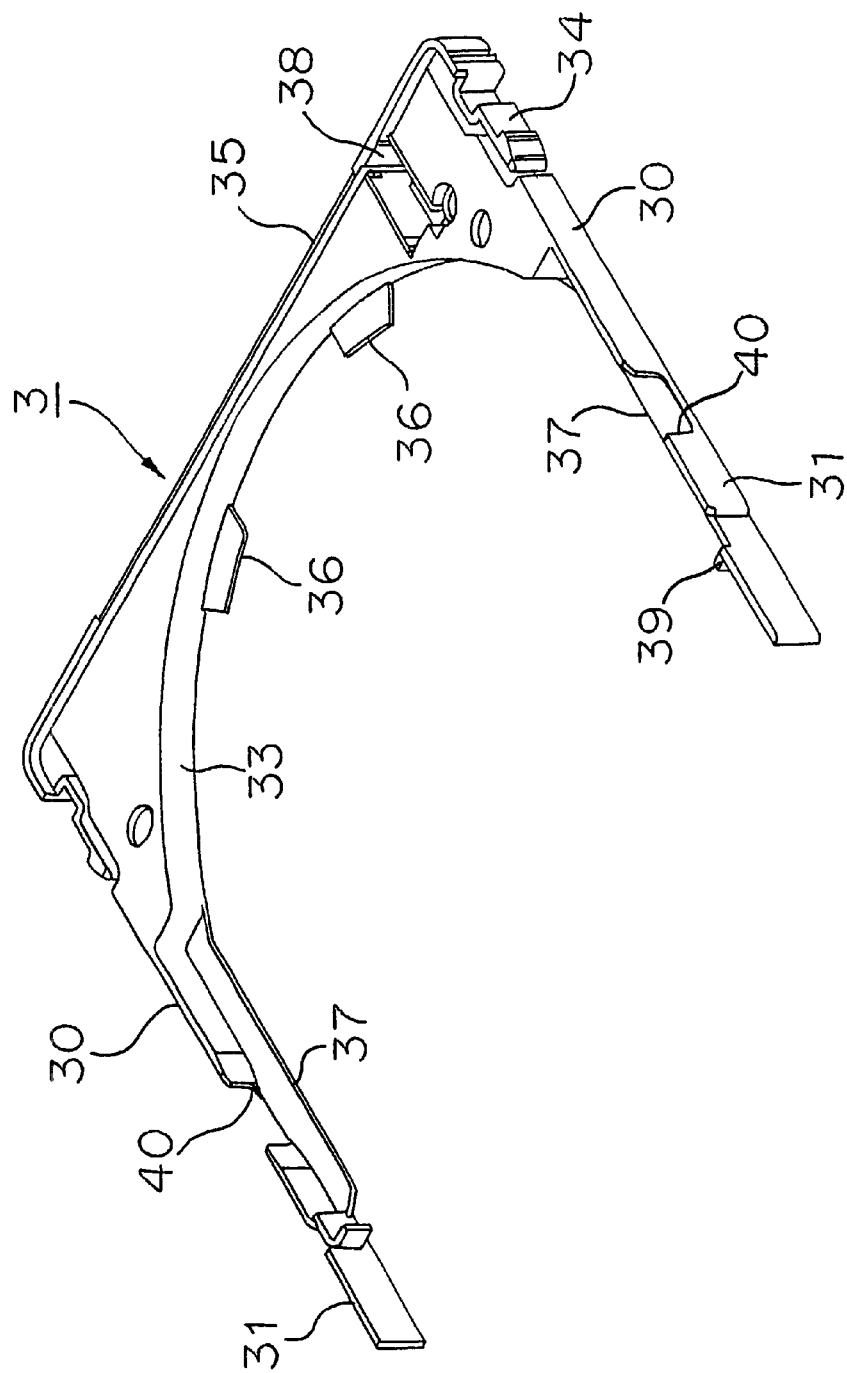
FIG. 19 is an enlarged perspective view of a cover member formed integrally with slide members shown in FIG. 18.

FIGS. 18 and 19 show a disk cartridge according to a fifth embodiment of the present invention wherein the same reference numerals as in FIGS. 1 to 3 designates the same or corresponding parts, and accordingly, description of these parts is omitted.

In the fifth embodiment, a cover member 3' is formed by molding so that arms 30 are formed integrally with slide portions 31' unlike the cover member 3 in the beforementioned embodiments. The slide portions 31' formed integrally with the arms 30 of the cover member 3' are fitted in a manner of sliding into guide grooves 24 formed at corresponding positions in the lower casing 2, whereby the cover member 3' can be drawn smoothly from the casings 1, 2 and a disk-like medium can be put or removed easily.

Even in this embodiment, in the same manner as the first to fourth embodiments, the disk-like medium taking-out part 15 for taking out the disk-like medium 4 is formed in a side face of the casing, which opposes the side of the casing provided with the shutter 5.

In the first to fifth embodiments of the present invention, the disk cartridge has the upper and lower casings in which a photo disk can be held, the shutter having a substantially channel-like shape in cross section which is movable in both directions, and the cover member capable of sliding and being drawn from the disk-like medium taking-out port formed at a side opposite the side where the shutter is disposed. Accordingly, when the cover member is to be drawn, the cover member is moved toward the direction opposite to a side of the shutter. Then, the disk-like medium receiving portion on which the disk-like medium is placed is pulled out from the casing, so that the disk-like medium can easily be taken out.

In a state that the cover member is completely retracted in the casing, the elastic locking members formed at both sides of the cover member can be engaged with recesses formed in the casing, whereby the cover member is prevented from being drawn suddenly. The cover member is provided with both side walls having disk supporting portions for supporting a lower surface of the disk-like medium at positions toward the shutter with respect to a linear line which is in parallel to an outer wall for forming a side wall of the disk cartridge, which is adapted to close the disk-like medium taking-out port, and which passes the center of the disk-like medium to be placed in the disk receiving portion. Namely, each of the disk supporting portions is at a position opposing the cover member. Further, the casing is provided with a circular arc rib to define the disk-like medium receiving portion in association with a circular arc wall formed in the cover member so as to correspond to the outer periphery of the disk-like medium. Accordingly, there is no risk of dropping of the disk-like medium from the cover member even when the disk-like medium taking-out port is opened, and the taking-out or placing of the disk-like medium can easily be done in a stable manner.

Further, the shutter having a substantially channel-like shape, which bridges front and back surfaces of a front portion of the casing to move slidingly to open or shut the driving shaft insertion holes and the head insertion holes in the casing, is provided with an elastic member for urging the shutter in a direction of shutting, whereby the shutter is moved smoothly, and it has durability.

In particular, in the first embodiment, since the cover member is capable of sliding in the casing and has a circular arc wall so as to correspond to the outer periphery of the disk-like medium, and tongue-like projections as a disk placing portion are formed in parts of a lower edge portion of the circular arc wall to support the disk-like medium from its lower portion, the molding property of the cover member is improved and the strength of the casing is well maintained.

Further, in the first embodiment, the cover member can be drawn to an extent that a distance of drawing is as long as the radius of the disk-like medium or more. In addition, the cover member has an outside-facing side wall for closing the disk-like medium taking-out port to provide a side wall of the cartridge, both side walls extended from the outside-facing side wall and a disk placing portion to thereby define a disk-like medium receiving portion. Since the both side walls are fitted to grooves in a manner of sliding formed in the casing, it is easy to take out or place the disk-like medium according to opening or closing the cover member. Further, the taking-out or placing of the disk can be conducted even when the casing is in an inclined state and safe handling operations are assured without a danger of dropping of the disk.

According to the second embodiment of the present invention, since the cover member is so arranged as to be folded in a direction of sliding movement of the cover member by means of the pivot means, the cover member can be folded at the position of the pivot means during the drawing, so that the exchanging of the disk-like medium can be easy.

Further, the cover member has the arms with pivot shafts at both sides, and the slide members with bearing holes to which the pivot shafts are inserted and disk supporting portions, wherein the slide members are connected to the arms so as to be folded, partition walls are extended from the slide members so as to face inner surfaces of the bearing holes, and the cover member is capable of sliding between the upper and lower casings by means of the slide members. Accordingly, the provision of the partition walls prevents the contact of the pivot shafts with the disk-like medium and serves as a dustproof means. Further, the partition walls serve as a stopper for preventing the disk-like medium from dropping by its own weight even when the disk taking-out port is directed downward. Further, since the slide members are produced separate from the cover member, good molding property is obtainable; there is no risk of causing a curve or a twist in molded products; the opening and closing operations of the cover member are smooth, and the taking-out or placing of the disk-like member in the opening and closing of the cover member is easy. In addition, even when the disk cartridge is in an inclined state, the taking-out or placing of the disk-like medium is possible and safe exchanging operations can be conducted without causing the drop of the disk.

According to the fourth embodiment of the present invention, a distance of drawing of the cover member is determined to be in a range of the radius of the disk-like member or more. Accordingly, the cover member is folded according to requirement, whereby operations of exchanging the disk-like medium are improved. Further, the disk-like medium receiving portion is defined by an outside-facing side wall which closes the disk-like medium taking-out port and constitutes a side wall of the disk cartridge, both side walls extended from the outside-facing side wall and a disk placing portion extended at a lower side of the disk-like medium between the outside-facing side wall and the both side walls. The both side walls are slide-fitted to the casing along side walls of the casing. Accordingly, it is easy to take out or place the disk-like medium when the cover member is opened or shut. Further, the disk-like medium can be exchanged even when the disk cartridge is inclined, and there is little possibility that the disk-like medium drops from the disk cartridge.

What is claimed is:

1. A disk cartridge comprising:

a casing having an upper casing portion and a lower casing portion, and configured to receive a disk-like medium in a rotatable manner, the casing having a disk-like medium taking-out port, a driving shaft insertion hole and a head insertion hole formed therein;

a shutter configured to open and close the driving shaft insertion hole and head insertion hole;

an elastic member configured to urge the shutter in a direction of closing the driving shaft and head insertion holes;

a cover member configured to cover the disk-like medium taking-out port between the upper and lower casing portions, the cover member being configured to be slidably drawn from the disk-like medium taking-out port with the disk-like medium and having a circular arc wall configured to compliment a portion of an outer periphery of the disk-like medium and at least one tongue-like projection positioned at a lower edge of the circular arc wall; and a plurality of slide members each pivotally connected to the cover member, the plurality of slide members being configured to slide between the upper and lower casing portions and support the disk-like medium;

wherein:

the plurality of slide members each has a bearing hole;

the cover member has a plurality of arms each extending from side portions of the cover member and having a pivot shaft positioned to engage with a respective one of the bearing holes; and the pivot shaft has a projection and the bearing hole has a notch positioned to receive the projection when the cover member is folded upwardly to and angle of 90°.

2. The disk cartridge according to claim 1, wherein the at least one tongue-like projection comprises a pair of tongue-like projections positioned symmetrically with respect to a center line of the cover member in a direction of sliding movement.

3. The disk cartridge according to claim 2, wherein the lower casing portion having recessed face portions for receiving the tongue-like projections of the cover member, respectively.

4. The disk cartridge according to claim 3, wherein the casing has a label area in an outer surface at a side of receiving the cover member, and a wall thickness of the tongue-like projections is thinner than a wall thickness of the recessed face portions for receiving the tongue-like projections of the cover member.

5. The disk cartridge according to claim 2, wherein the lower casing portion has a slope formed at an edge portion, facing a side of the disk-like medium taking-out port, of an inner face and in an area where each of the tongue-like projections is passed at the time of operating the cover member, and the inner face of the lower casing is gradually reduced in height toward the disk-like medium taking-out port.

6. The disk cartridge according to claim 1, wherein the casing has a plurality of guide grooves positioned to slidably receive a respective one of the plurality of slide members.

7. The disk cartridge according to claim 1, wherein the plurality of slide members each has an arced wall configured to compliment an outer periphery portion of the disk-like medium.

8. The disk cartridge according to claim 1, wherein the plurality of slide members each has an engaging portion positioned to engage with the disk-like medium when the cover member is being drawn out from the casing.

* * * * *

UNITED STATES PATENT AND TRADEMARK OFFICE
CERTIFICATE OF CORRECTION

PATENT NO.    : 6,418,113 B1
DATED         : July 9, 2002
INVENTOR(S)   : Masaru Ikebe et al.

Page 1 of 1

It is certified that error appears in the above-identified patent and that said Letters Patent is hereby corrected as shown below:

<u>Column 10,</u>
Line 40, change "39" to -- $39_1$ --; and
Line 64, change "31" to -- $31_1$ --.

<u>Column 14,</u>
Line 30, change "slide" to -- sliding --.

Signed and Sealed this

Twenty-third Day of December, 2003

JAMES E. ROGAN
*Director of the United States Patent and Trademark Office*